United States Patent [19]

Meyer

[11] Patent Number: 5,423,249
[45] Date of Patent: Jun. 13, 1995

[54] FOOD DEHYDRATOR

[75] Inventor: Michael F. Meyer, Ramsey, Minn.

[73] Assignee: American Harvest, Inc., Chaska, Minn.

[21] Appl. No.: 177,716

[22] Filed: Jan. 12, 1994

[51] Int. Cl.⁶ .................... A23B 4/04; F26B 23/06; F26B 25/18

[52] U.S. Cl. .................... 99/483; 34/196; 34/197; 99/476; 126/21 A; 219/386; 219/400

[58] Field of Search .................. 99/447–449, 99/467, 468, 473, 476, 483; 34/196, 197, 238; 126/21 A; 219/386, 400; 312/236

[56] References Cited

U.S. PATENT DOCUMENTS

| 4,190,965 | 3/1980 | Erickson. | |
|---|---|---|---|
| 4,536,643 | 8/1984 | Erickson. | |
| 4,619,053 | 10/1986 | Schumacher | 99/483 X |
| 4,780,596 | 10/1988 | Matsushima et al. | 219/400 |
| 5,215,004 | 6/1993 | Su. | |
| 5,235,906 | 8/1993 | Hsu | 34/196 |
| 5,311,673 | 5/1994 | Su | 34/197 |

*Primary Examiner*—Timothy F. Simone
*Attorney, Agent, or Firm*—Merchant, Gould, Smith, Edell, Welter & Schmidt

[57] ABSTRACT

A food dehydrator for drying food with a heated airflow is disclosed, the food dehydrator having a base defining a base inlet, a plurality of stackable trays defining an outer duct along the circumference of each of the plurality of trays, and a top member having an outer outlet defined along the circumference of the top member, the outer outlet being in substantial alignment with the outer duct defined by the trays.

14 Claims, 12 Drawing Sheets

FOOD DEHYDRATOR

TECHNICAL FIELD OF THE INVENTION

The present invention relates to an apparatus for treating food and more particularly to apparatus for treating food by passing a heated stream of air over the food in order to dehydrate the food to a shelf stable condition.

BACKGROUND

Preservation of food by dehydration is well known in the art. The early dehydration of food was typically carried out by placing the food product in an open container exposed to the air and to the sun. In more recent times, mechanical food dehydrators have been developed for use in the home, as well as for use in industry. Examples of such devices are described in U.S. Pat. Nos. 1,954,239, 2,017,728, 2,412,407 and 4,190,965, and are incorporated herein by reference. The known food dehydrators often include a plurality of shelves contained within a cabinet onto which the food to be dried is placed. The dehydrator typically uses a motor-driven fan to draw air in through openings and circulate the air throughout the dehydrator. A heater is provided for heating the air before it is circulated by the fan throughout the dehydrator.

One issue common to known food dehydrators is their need to regulate the temperature within the dehydrator at a uniform and safe operating level. This need is especially urgent since most motors typically used in dehydrators are often inefficient. One example of such a motor is the shaded pole motor, which runs at only 40–50% efficiency. As a result, they can become quite hot during use. While the venting and cooling systems provided within the dehydrators help to cool the motors, the risk of overheating is not eliminated.

Excess temperatures, however, can overheat the dehydrator and cause damage to its internal components. Overheating also poses serious safety hazards to persons using the dehydrator. It has been typical, therefore, to insert temperature-regulating devices, such as thermostats within the dehydrator to minimize the risk of overheating. The addition of thermostate, however, increases the overall cost of the dehydrator in several respects. To being with, the thermostats themselves are an element of cost. Moreover, additional structure must be added to the dehydrator in order to support the thermostat within the dehydrator. As a result, not only the material cost, but also the labor costs involved in manufacturing and assembling the dehydrator are increased. On the other hand, the applicant has determined that there is a demand for a food dehydrator which is relatively inexpensive to manufacture.

Accordingly, there is a need for a food dehydrator which provides for regulation of the temperature within the dehydrator without the need for additional temperature-regulating devices, such as a thermostat, so that a food dehydrator that is relatively inexpensive to manufacture and assembly may be achieved.

SUMMARY OF THE PRESENT INVENTION

The present invention provides for a food dehydrator for drying food with a heated airflow. The food dehydrator has a base defining a base inlet, a plurality of stackable trays defining an outer duct along the circumference of each of the plurality of trays, and a top member having an outer defined along the circumference of the top member, the outer outlet being in substantial alignment with the outer duct defined by the trays.

A preferred embodiment of the present invention includes a food dehydrator having a base defining a base inlet, the base inlet being configured to receive a flow of air from the atmosphere. The food dehydrator also includes a motor-driven fan supported within the base and adapted to move the airflow received from the base inlet throughout the dehydrator, and a heater supported within the base for heating the airflow. The food dehydrator further includes a plurality of stackable trays positioned on the base, each of the plurality of trays defining a centrally-located opening and including an outer duct defined by each of the plurality of trays along the circumference of each of the plurality of trays through which at least a portion of the airflow directed from the base may pass, a tray inlet defined by each of the plurality of trays along the circumference of each of the plurality of trays through which a portion of the airflow from the outer duct may be directed inwardly across each of the plurality of trays, a tray outlet defined by each of the plurality of trays along the centrally-located opening of each of the plurality of trays through which a portion of the airflow moving inwardly across each of the plurality of trays may exit, an inner duct which is defined by each of the plurality of trays along the centrally-located opening of each of the plurality of trays, and through which the portion of the airflow from the tray outlet may be directed, and a top member partially covering the uppermost tray of the plurality of trays, the top member defining an inner outlet which cooperates with the inner duct and out of which at least a portion of the airflow from the inner duct may exit to the atmosphere, the top member also defining an outer outlet out of which at least a portion of the airflow from the outer duct may exit to the atmosphere, the exit of the airflow from the outer outlet serving to prevent overheating of the dehydrator.

DETAILED DESCRIPTION OF THE PREFERRED EMBODIMENT

Figure 1:
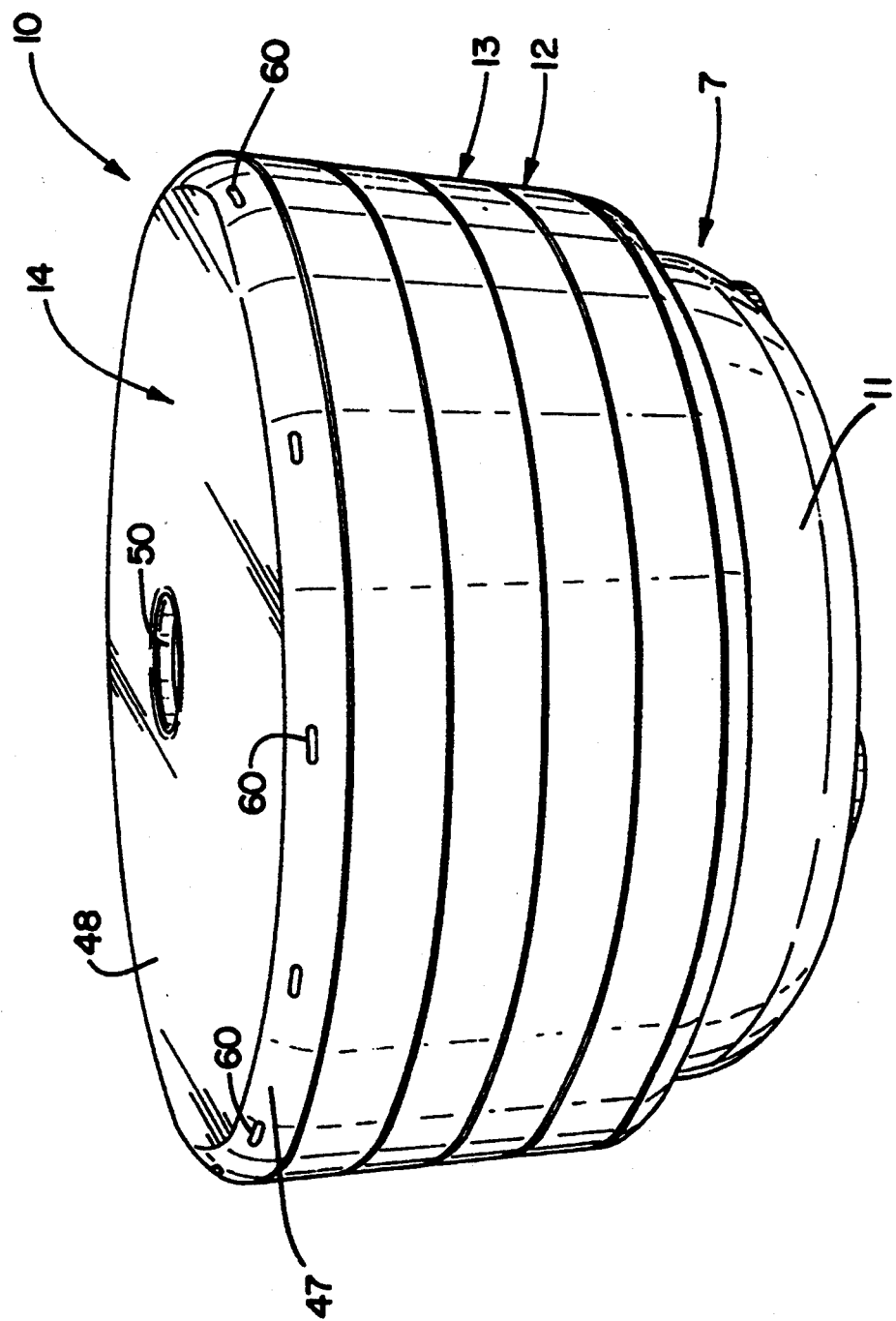
FIG. 1 shows a perspective view of a preferred embodiment of a food dehydrator according to the present invention.

The food dehydrator 10 as shown in FIG. 1 may include a base 7, a plurality of trays such as 12 and 13 as well as a top member 14. Base member 7, trays 12 and 13 and top member 14 may be suitably formed such as by injection molding of a thermoplastic material.

Figure 4:
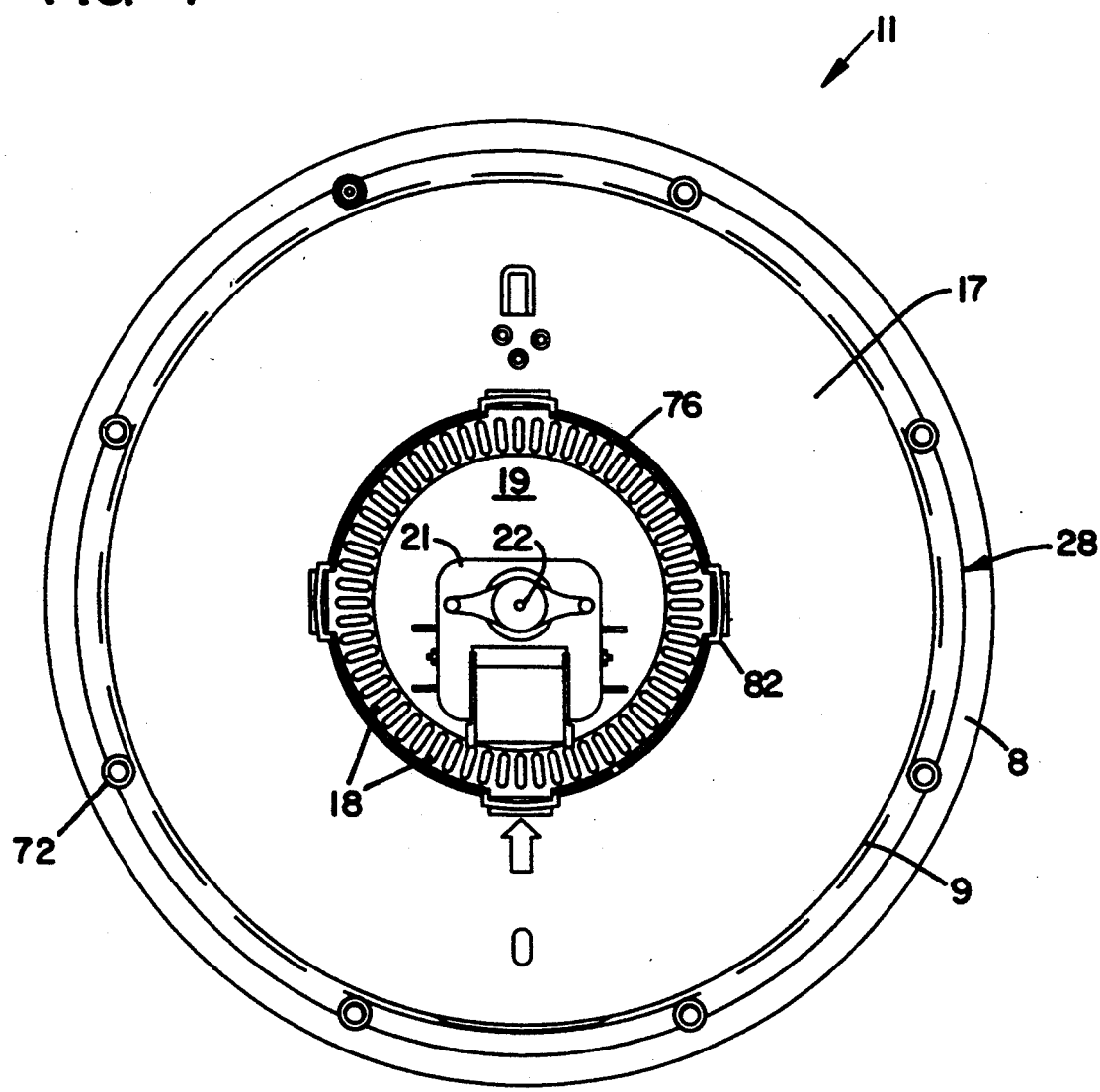
FIG. 4 is a top plan view of the base of the food dehydrator of FIG. 1 with the base and cavity covers removed.
Figure 5:
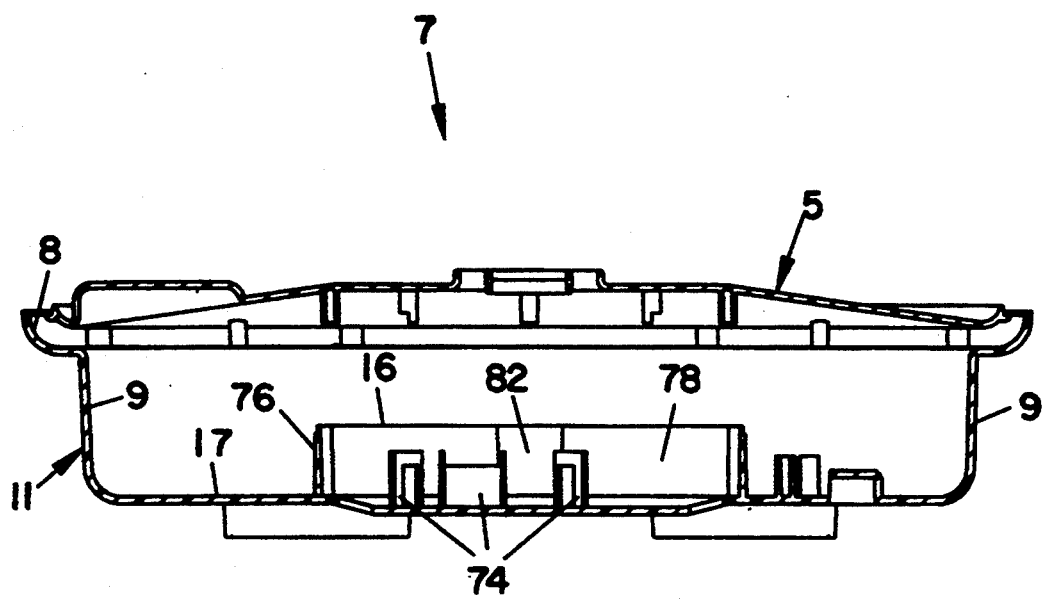
FIG. 5 is a cross-sectional view of the base of the food dehydrator of FIG. 1 with portions removed for clarity.

As is best shown in FIGS. 4 and 5, base 7 includes a base member 11 having a floor 17 and a generally cylindrical side wall 9 projecting upwardly from floor 17, and a base cover 5. Side wall 9 preferably includes a lip 8 formed along the upper edge of said wall 9 to support base cover 5 and to receive adjacent tray 12. Base cover 5 covers base member 11 so as to provide an insulating zone 24. In this manner, air contained within insulating zone 24 becomes pressurized.

Figure 6:
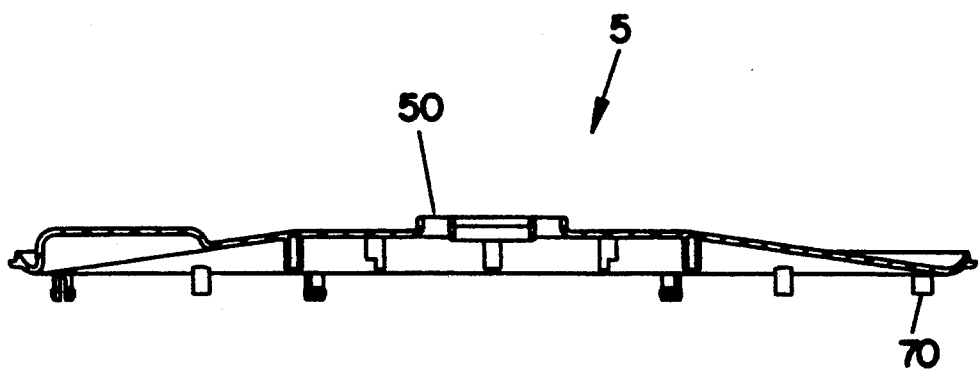
FIG. 6 is a cross-sectional view of the base cover shown in FIG. 5.

For ease of assembly, base cover 5 is preferably removably attached to base member 11. Accordingly, base cover 5 includes a plurality of projection members 70 (see FIG. 6) projecting downwardly towards lip 8 (see FIGS. 4 and 5. As is further shown in FIG. 6, lip 8 may include a plurality of holes 72 aligned with and adapted to receive projection members 70 in order to secure base cover 5 to base member 11. Projection members 70 are preferably flexible to snap into and out of holes 72. Preferably, the diameter of holes 72 is slightly smaller than the diameter of projection members 70 to ensure a tight fit between base cover 5 and base member 11.

Floor 17 may include a plurality of openings 18 which serve as an air inlet for dehydrator 10. Floor 17 further includes a cavity 19 created by a wall 76 in which a motor 21 may disposed. Wall 76 preferably encloses openings 18 so that substantially all of the air drawn in through openings 18 is directed through cavity 19 and across motor 21. This directed flow of air helps heat the airflow and also helps cool motor 21 during use and hence, helps prevent motor 21 from overheating. The amount of air drawn over motor 21 is maximized when wall 76 has substantially the same shape as the air inlet formed by openings 18 and when it is placed just outside the outer periphery of the air inlet.

Base member 11 may also include a cavity cover 16 for at least partially covering motor 21. Motor 21 may include an upwardly extending shaft 22 which drives a fan 23. Fan 23 is driven by motor 21 and circulates the air drawn in through openings 18.

Figure 12:
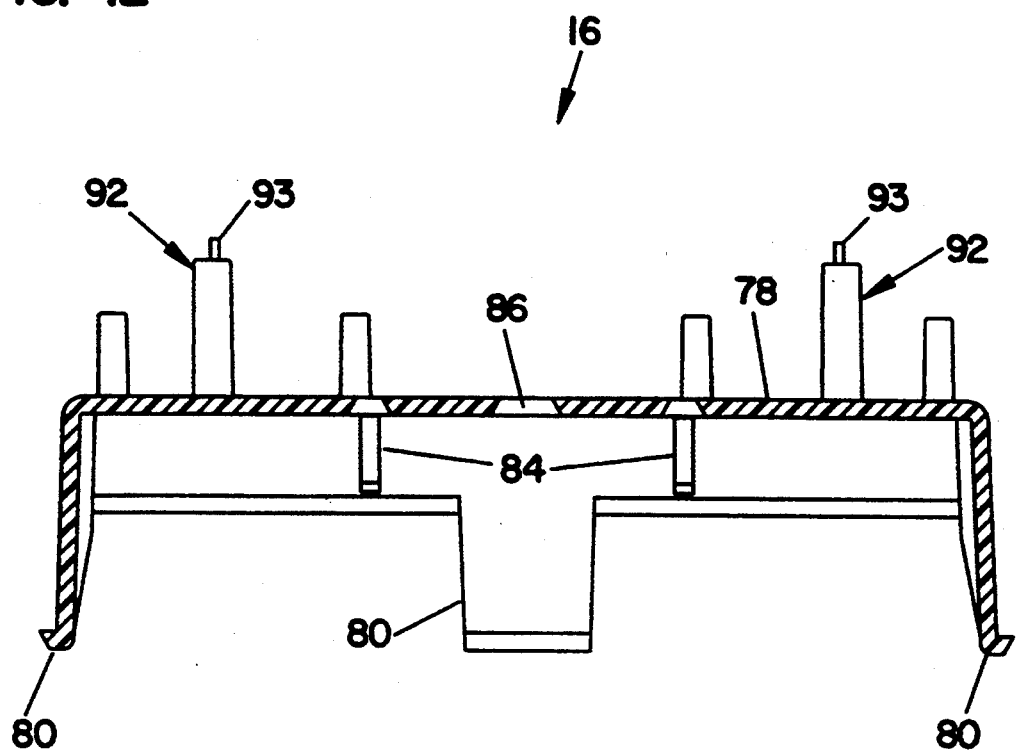
FIG. 12 is a cross sectional view of the cavity cover taken along the lines 12—12 in FIG. 11.

Cavity cover 16 is shown at least partially covering cavity 19 created by wall 76 (see FIG. 5). As can best be seen in FIG. 12, cavity cover 16 has a substantially planar top surface 78, and a plurality of extension members 80 projecting downwardly from top surface 78 towards base 7. Accordingly, wall 76 is provided with a plurality of pockets 82 (see FIGS. 4 and 5) aligned with and adapted to receive extension members 80 so that cavity cover 18 may be secured to base member 11 of base 7. For ease of assembly, extension members 78 are preferably flexible to snap into and out of pockets 82. Alternatively, wall 76 and cavity cover 18 may be replaced by a uniform enclosure member (not shown). Cavity cover 18, however, is preferably removable and does not form part of base 7, so that, for example, it may be easily replaced if damaged. As also previously noted, using a cavity cover 18 with extension members 80 as shown which efficiently clip into pockets 82 results in highly efficient assembly.

Cavity cover 18 also preferably includes a plurality of biasing members 84 projecting downwardly from top surface 78 of cavity cover 18 towards motor 21. Biasing members 84 are preferably flexible and extend to bias against the upper surface of motor 21 when cavity cover 18 is secured to base 7. Alternatively, biasing members 84 could protrude from other surfaces in base 7, such as wall 76 or base floor 17 (not shown). Likewise, biasing members 84 could be replaced by a single biasing member (not shown). Such engagement between cavity cover 18 and motor 21 serves to prevent motor 21 from moving or vibrating during operation of the device. Alternatively, motor 21 may be secured to floor 17 such as by screws (not shown). However, use of screws would likely increase assembly costs.

Figure 11:
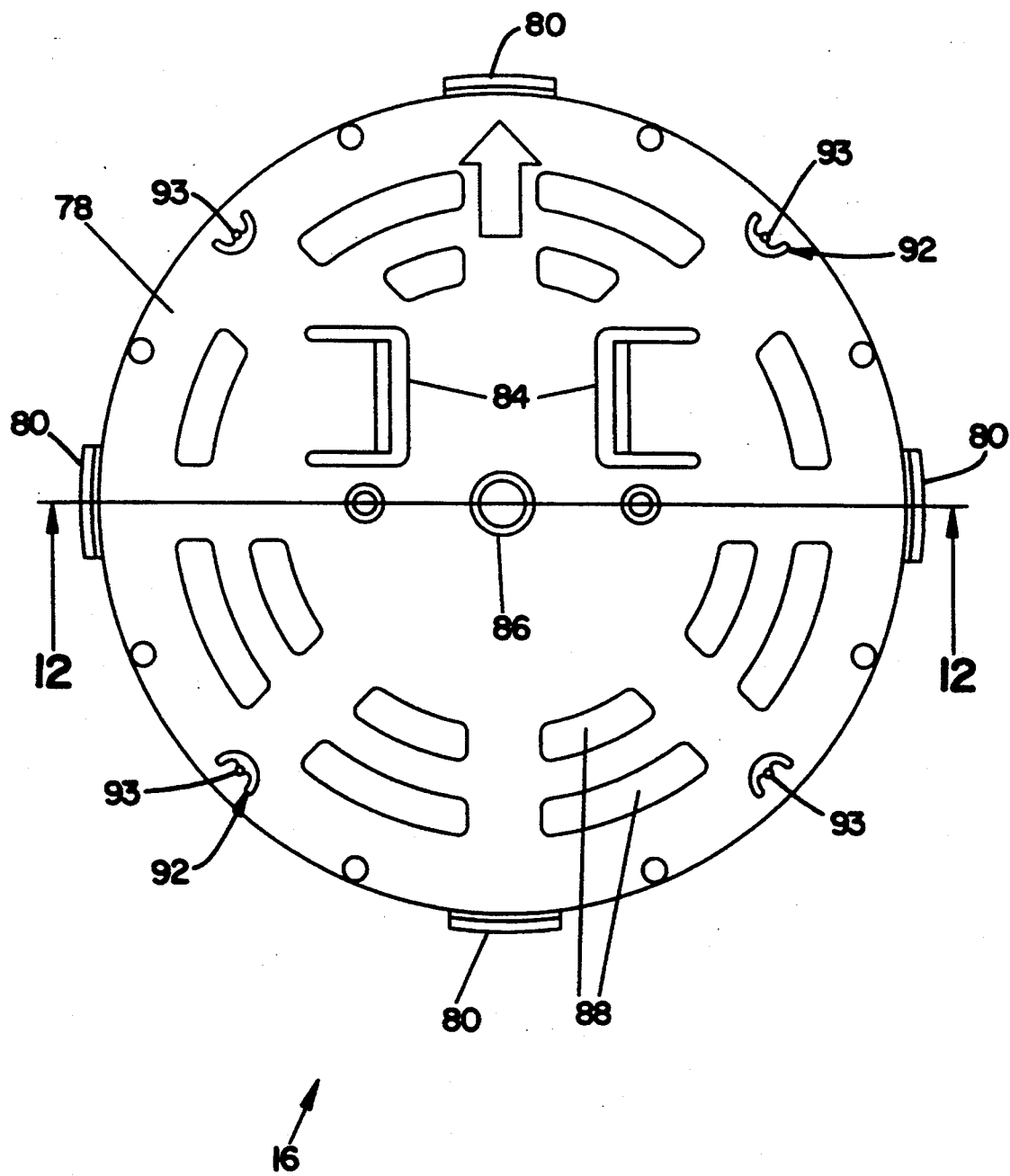
FIG. 11 is a top plan view of cavity cover shown in FIG. 9.

As can best be seen in FIG. 11, top surface 78 of cavity cover 18 may include a centrally located opening 86 for receiving motor shaft 22 upon which fan 23 is mounted. Top surface 78 may further include a single opening (not shown) or a plurality of openings 88 through which air drawn in from base 7 via cavity 19 may be directed. Openings 88 are preferably positioned between the far outside diameter and the outer periphery of top surface 78 so that the air drawn in through openings 88 is not obstructed by fan 23.

Figure 7:
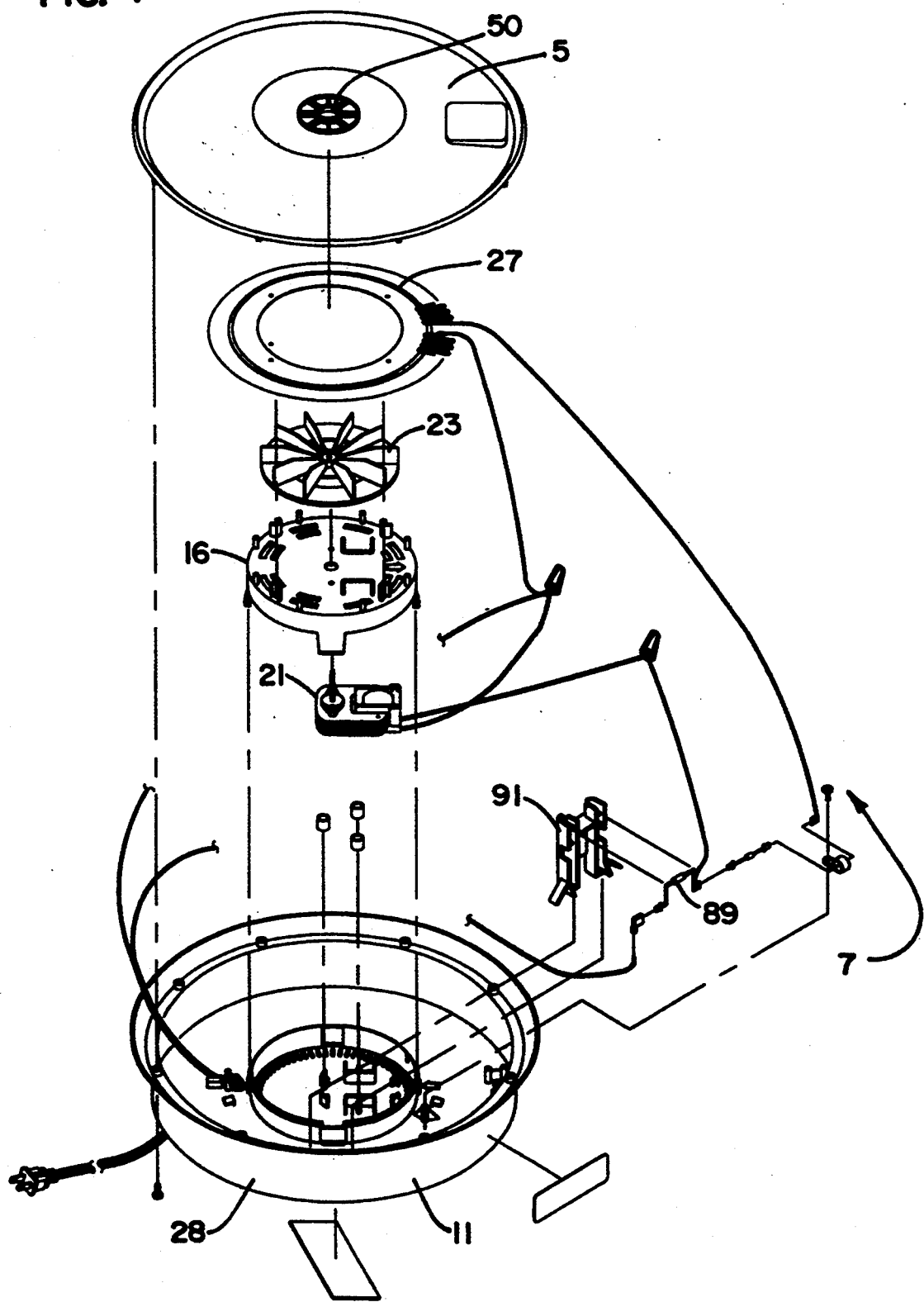
FIG. 7 is an exploded assembly view of the base shown in FIG. 1.

Fan 23 circulates the air drawn in through openings 88. Fan 23 is preferably a radial-type fan configured to move the airflow in a substantially outwardly, radial direction (see FIGS. 7 and 9). However, it can be appreciated that other fans could be used, such as, for example, an axial fan (not shown). A fuse 89 (see FIG. 7) may be mounted witin the base member 11 via a fuse bracket 91. Fuse 89 is preferably adjacent the airflow coming off fan 23. Fuse 89 turns off the power used to run dehydrator 10 when the temperature witin the dehydrator 10 exceeds a predetermined threshold temperature, so as to help prevent dehydrator 10 from overheating.

Referring back to FIG. 11 as well as again to FIG. 12, cavity cover 18 may also include a plurality of support members 92 projecting upwardly from a top surface 78 for supporting heater 27. Support members 92 preferably have a thin, pin-like end 93 members.

Figure 2:
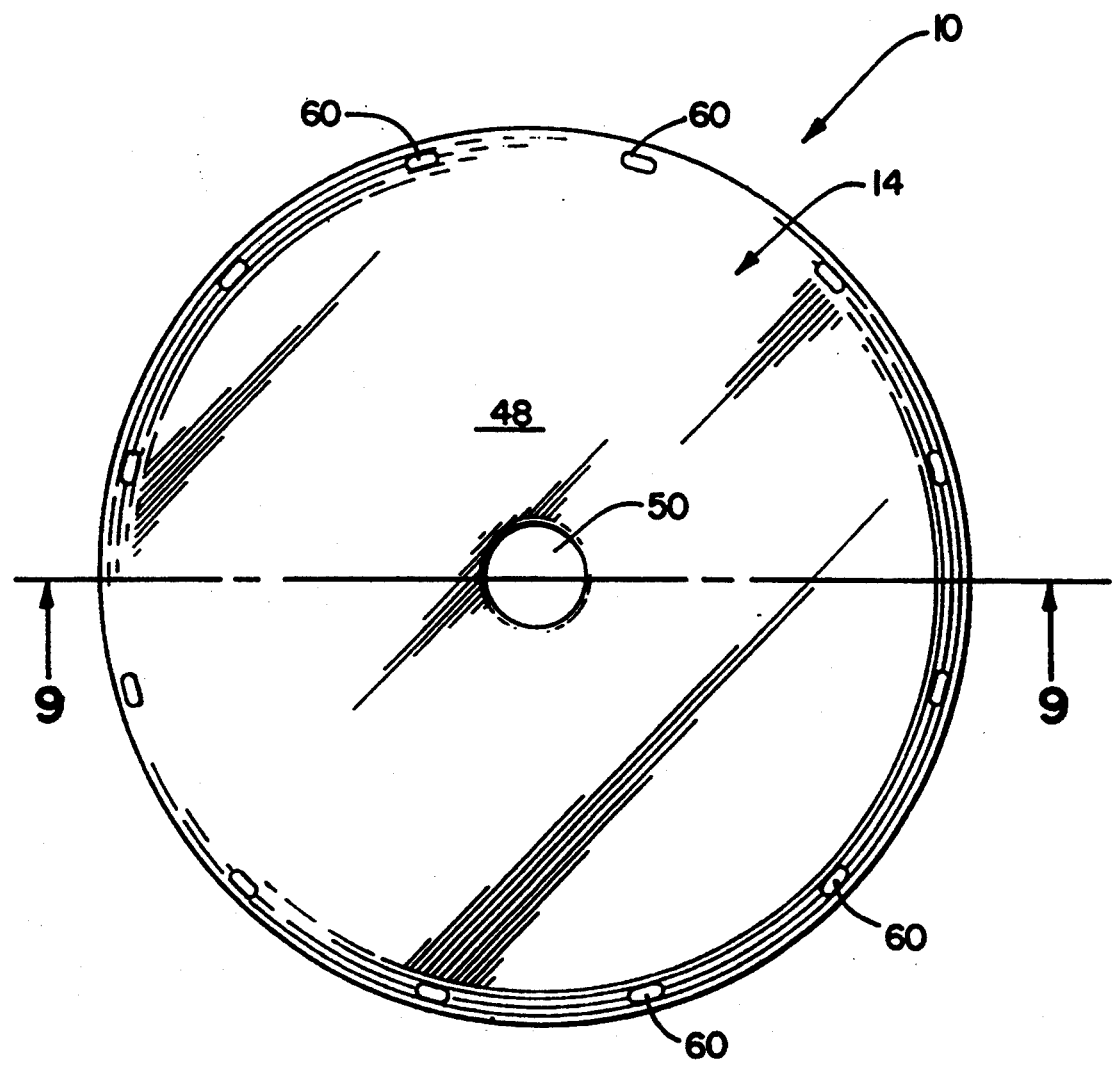
FIG. 2 is a top view of the top member of the food dehydrator shown in FIG. 1.
Figure 3:
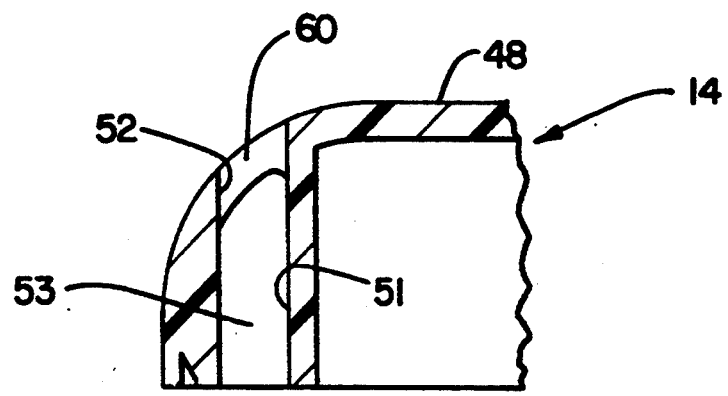
FIG. 3 is an enlarged fragmentary cross section through a vent of the top member of the food dehydrator of FIG. 1.
Figure 8:
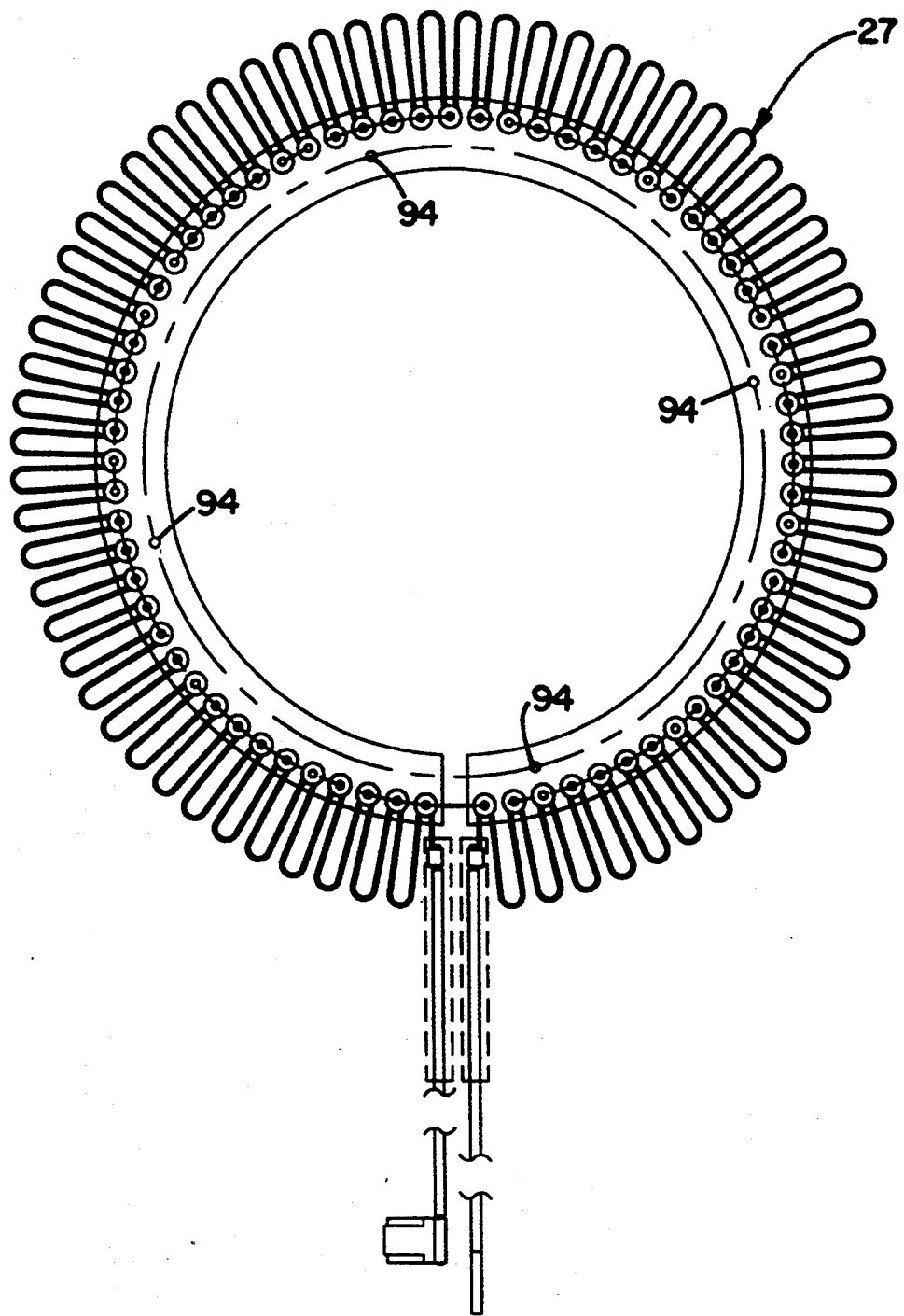
FIG. 8 is a top plan view of the heater shown in FIG. 7.

Heater 27, which is the primary system for heating the air circulated by fan 23. With reference to FIG. 8, heater 27 is preferably an electrical resistance heater having a substantially planar configuration. Heater 27 includes a plurality of openings 94 for receiving pin-like end members 93 of support members 92 (see FIG. 7). The diameter of openings 94 in heater 27 is preferably only slightly larger than the diameter of pin-like ends 93 to minimize movement of heater 27 during use. Accordingly, such a heater configuration, particularly when supported by a radial fan such as 23, reduces the amount of resistance to the radial airflow away from a radial fan such as 23 and thus increases the airflow efficiency therein. Preferably, heater 27 is coplanar with and adjacent fan 23 so that the air being thrown off the blades of fan 23 is immediately heated. It can be appreciated, however, that heater 27 may be placed further away from fan 23 without significantly affecting the heating of the airflow. Base cover 5 includes a centrally located opening 50 for allowing a portion of the airflow circulated through the trays to return to base 7 (see FIGS. 2 and 9).

Figure 9:
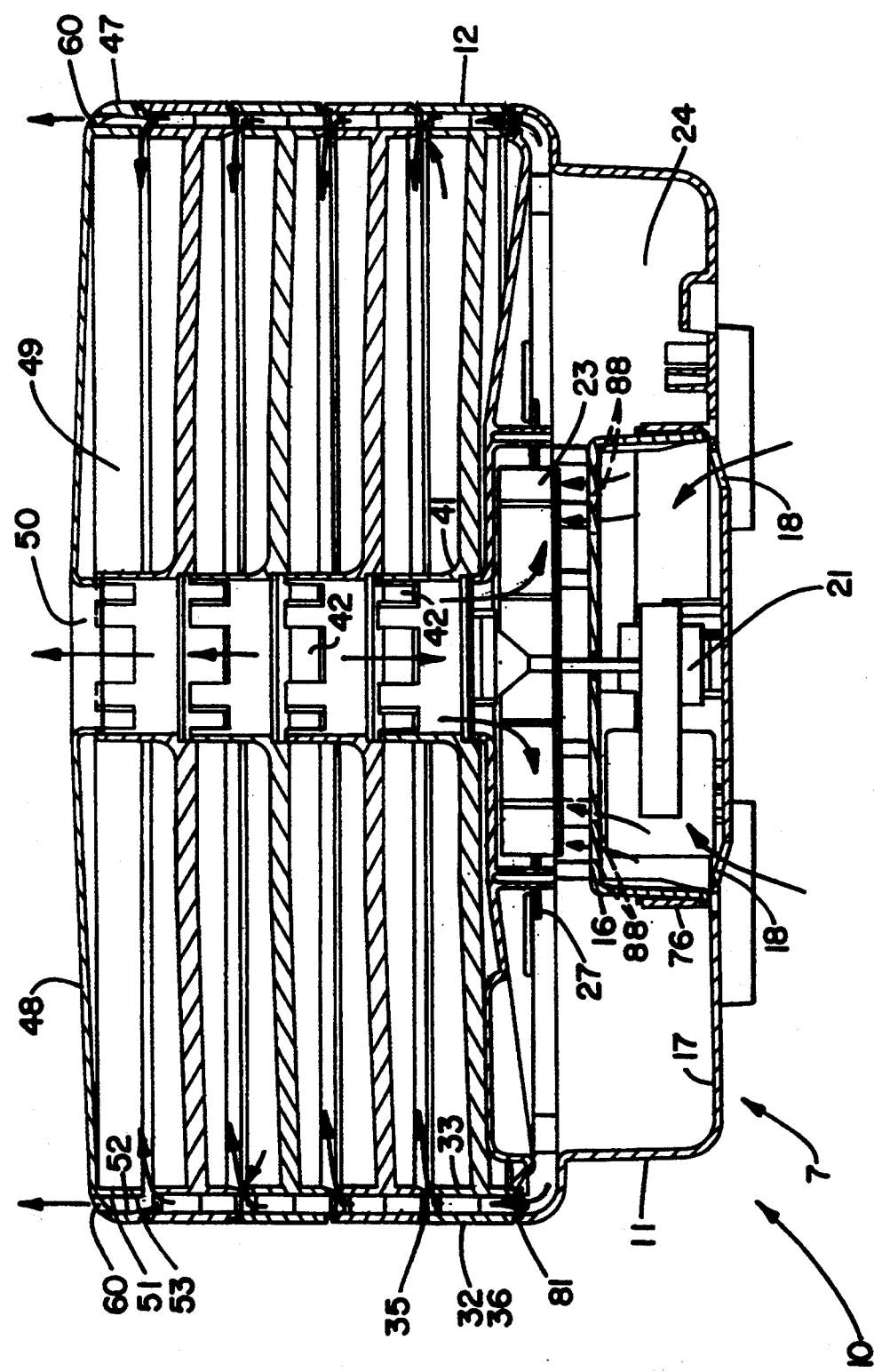
FIG. 9 is a cross-sectional view of the food dehydrator shown in FIG. 1 taken along the lines 9—9 in FIG. 2.
Figure 10:
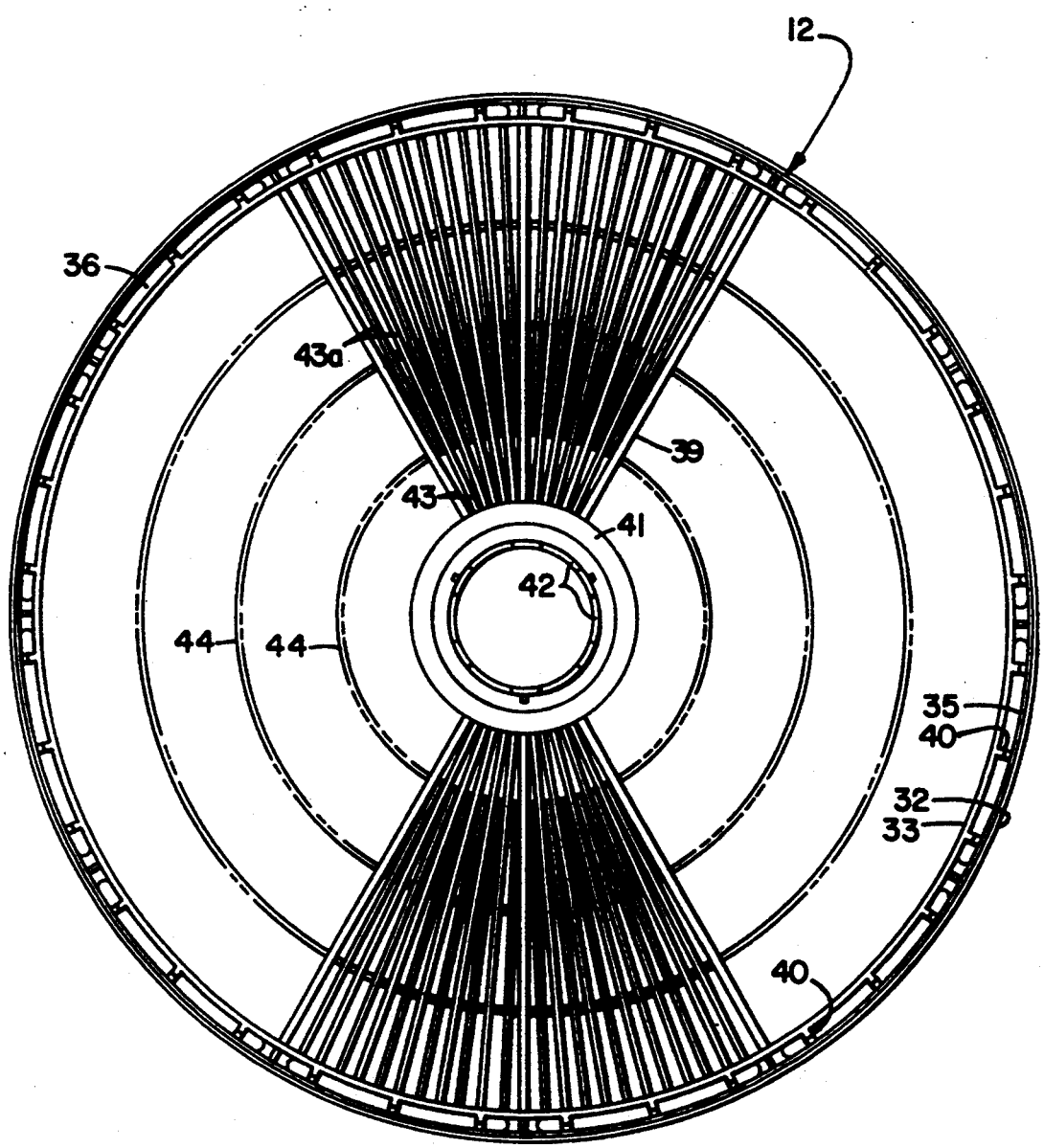
FIG. 10 is a top plan view of one of the trays of the food dehydrator shown in FIG. 1.

The plurality of stackable trays are illustrated by tray 12 shown in FIGS. 9 and 10. Tray 12 may include an insulating zone 31 which consists of an outer wall 32 and an inner wall 33. Outer wall 32 further serves as a support and may rest in the adjacent lip 8 of base member 11. Outer wall 32 may have a channel 35 defined therein for engagement of the next higher tray 13. Such engagement serves to lock the trays against axial movement.

An air duct 36 is defined between inner wall 33 and outer wall 32. A plurality of supports 40 extend between inner wall 33 and outer wall 32. Outer wall 32 and inner wall 33 run circumferentially around tray 12. It is to be noted that air duct 36 opens downwardly to receive air from base member 11 (in the case of the lowermost tray) or the tray directly underneath. Air duct 36 may also open upwardly to pass on at least a portion of the airflow so received. Inner wall 33 includes a plurality of slot-like openings 38 through which air may pass. Tray 12 also includes a support surface 39 which extends from inner wall 33 to a hub-like wall 41 at the center of tray 12. Hub-like wall 41 includes a plurality of slot-like openings 42 through which the air stream from openings 38 may pass. Hub-like wall 41 serves to form an inner duct 45 to return a portion of the airflow to fan 23 and a portion of the airflow upwardly through the adjacent trays to the atmosphere.

As can best be seen in FIG. 10, support surface 39 may be comprises of a plurality of spoke-like members 43. Spoke-like member 43 may be supported by ring-like ribs 44 and 46. Shorter spoke-like members 43a may be provided between spoke like members 43. Space may be provided between each of spoke-like members 43 and 43a so that the airflow may pass through support surface 39.

As shown in FIGS. 1 and 9, top member 14 serves to cover the uppermost tray and has a top wall 48 and a circumferential side wall 47. Top wall 48 and support surface 39 of the uppermost tray serve to provide an insulating zone 79 therebetween. Top member 14 also includes a pair of concentric outer walls 51 and 52 which provide an outer duct 53. Other duct 53 is preferably substantially aligned with air duct 36. Top member 14 further includes a plurality of vent openings 60 substantially aligned with outer duct 53 to prevent overheating of dehydrator 10. Opening 50 of top member 14 is also preferably aligned with inner duct 45 to allow the airflow therefrom to escape therefrom.

Although many other combinations are possible, it has been found that, for a good dehydrator 10 of the general configuration shown having a diameter of approximately 13.5 inches, a suitable heater 27 comprises a resistance element of ribbon material made of FeCrAl resistance wire having a total resistance of approximately 30 ohms. Such a heater element may be purchased from Hartford under part number 400-00180. With this particular heater in the food dehydrator embodiment shown, it has been found that, by powering the heater element with 110 volts of alternating current connected in series through a diode (e.g., part number 1N5404 from Pace), that the heat emerging through vent openings 60 is sufficient to prevent overheating of dehydrator 10. In the preferred embodiment, a total of 12 vent openings 60 are employed, and each vent opening is approximately 0.09 square inches in size.

OPERATION OF THE INVENTION

Although operation of the present invention is apparent from the preceding description, it will be detailed hereinafter in order to provide a more complete understanding. Dehydrator 10 may be placed in operation by plugging in the power cord of the dehydrator (not shown). When plugged in, motor 21 is placed in operation and electrical current is fed to heater 27. Motor 21 pulls an airflow ito dehydrator 10 through openings 18 in floor 17 of base member 11. Due to biasing members 84 of cavity cover 18, however, vibration of motor 21 is minimized during use. Fan 23 pulls air into dehydrator 10 through openings 18 in floor 17 and directs it radially outwardly toward duct 36 of tray 12. Due to wall 76 and cavity cover 16, substantially all of the air pulled in through cavity 19 is directed across motor 21. Since heater 27 is aligned with the direction of the airflow, and due to the non-obtrusive construction of heater 27, the airflow circulated by fan 23 is left substantially unimpeded.

A portion of the airflow then moves through openings 38 in circumferential wall 37 into air duct 36 and a portion of the airflow subsequently passes inwardly across the food product (not shown) which typically is supported on spoke-like members 43 and 43a towards openings 42 in hub wall 41. The other portion of the airflow is moved upwardly through air duct 36. The air after passing through openings 42 may either move upwardly and out of dehydrator 10 through opening 50 of inner duct 45 or downwardly into fan 23 for recirculation through drying trays 12, 13 and the like. Since the spoke-like members 43 and 43a are aligned with the direction of the airflow, they do not create a disturbance in the airstream. Spoke-like members 43 and 43a preferably permit air to move beneath the food product and between adjacent spokes.

As previously explained, the present dehydrator promotes a temperature-regulated environment within the dehydrator. In particular, a portion of the heated air entering air duct 36 is directed upwardly through outer duct 53 of top member 14 and out of vent openings 60 to exit into the atmosphere.

The foregoing constitutes a description of various preferred embodiments. Numerous changes to the preferred embodiments are possible without departing from the spirit and scope of the invention. Hence, the scope of the invention should be determined with reference not to the preferred embodiments, but to the following claims.

What is claimed is:

1. A food dehydrator for drying food comprising:
   a base, the base including a base inlet defined by the base and configured to receive a flow of air from the atmosphere;
   a motor-driven fan supported within the base and adapted to move the airflow received from the base inlet throughout the dehydrator;
   a heater supported within the base;
   a plurality of stackable trays positioned on the base, each of the plurality of trays defining a centrally-located opening and including:
      an outer duct defined by each of the plurality of trays along the circumference of each of the plurality of trays through which at least a portion of the airflow directed from the base may pass;
      a tray inlet defined by each of the plurality of trays along the circumference of each of the plurality of trays through which a portion of the airflow from the outer duct may be directed inwardly across each of the plurality of trays;

a tray outlet defined by each of the plurality of trays along the centrally-located opening of each of the plurality of trays through which a portion of the airflow moving inwardly across each of the plurality of trays may exit;

an inner duct which is defined by each of the plurality of trays along the centrally-located opening of each of the plurality of trays, and through which the portion of the airflow from the tray outlet may be directed; and a top member partially covering the uppermost tray of the plurality of trays, the top member defining an inner outlet which cooperates with the inner duct and out of which at least a portion of the airflow from the inner duct may exit to the atmosphere, the top member also defining an outer outlet out of which at least a portion of the airflow from the outer duct may exit to the atmosphere, the exit of the airflow from the outer outlet serving to prevent overheating of the dehydrator.

2. The food dehydrator of claim 1 further comprising a base cover member substantially covering the base in order to pressurize the portion of the airflow passing from the base of the outer duct.

3. The food dehydrator of claim 1, wherein the outer outlet includes at least one opening defined by the top member and substantially aligned with the outer duct.

4. The food dehydrator of claim 3, wherein the inner outlet includes a single opening defined by the top member and substantially aligned with the inner duct.

5. A food dehydrator comprising:

a base, the base including a base inlet defined by the base and adapted to receive a flow of air from the atmosphere;

a motor-driven fan supported within the base and configured to move the airflow received from the base inlet throughout the dehydrator;

a heater supported within the base of configured to heat the airflow received from the inlet;

a plurality of vertically stackable trays, each of the plurality of trays defining a centrally-located opening and including:

an outer duct defined along the circumference of each of the plurality of trays through which at least a portion of the airflow from the base may be directed;

a tray inlet defined along the circumference of each of the pluraltiy of trays through which a portion of the airflow from the outer duct may be directed inwardly across each of the plurality of trays;

a tray outlet which is defined along the centrally-located opening of each of the plurality of trays and through which the portion of the airflow moving inwardly across each of the plurality of trays may exit; and an inner duct which is defined by the stacked, centrally-located opening of the plurality of trays and through which a portion of the airflow from the tray outlet may be directed; and a top member partially covering the uppermost tray of the plurality of trays, the top member including vent means defined substantially around the circumference of the top member for allowing a portion of the airflow from the outer duct to exit to the atmosphere so that overheating of the dehydrator is prevented.

6. The food dehydrator of claim 5, wherein the outer duct is defined by a pair of spaced circumferential walls.

7. The food dehydrator of claim 5, wherein each of the plurality of trays includes an inner hub wall defining the tray outlet along the circumference of the centrally-located opening of each of the plurality of trays.

8. The food dehydrator of claim 7, wherein the inner hub wall defines a plurality of vertically oriented slots.

9. A food dehydrator comprising:

a base including base inlet means for receiving a flow of air from the atmosphere, means for positively moving the airflow throughout the food dehydrator, and means for heating the airflow;

a plurality of stackable trays, each of the plurality of trays including:

an outer duct along the circumference of each of the plurality of trays to permit the airflow to pass from the base to each of the plurality of tray;

tray inlet means along the circumference of each of the plurality of trays to provide that a portion of the airflow moves inwardly along each of the plurality of trays; and tray outlet means adjacent the axial center of each of the plurality of trays to exhaust at least a portion of the airflow to the atmosphere; and a top member adapted to superimpose over the uppermost of the plurality of trays and partially covering the uppermost tray, the top member including an inner outlet for cooperation with the tray outlet means to exhaust the airflow to the atmosphere, the top member also including an outer outlet aligned with the outer duct to exhaust the airflow to the atmosphere, the exhausted airflow from the outer outlet serving primarily to help prevent overheating of the dehydrator.

10. The food dehydrator of claim 9, wherein each of the plurality of trays includes means for insulating around the circumference thereof.

11. The food dehydrator of claim 10, wherein the insulating means comprises double wall means defining a downwardly opening pocket.

12. The food dehydrator of claim 9, wherein each of the trays includes a plurality of spoke-like supports, an outer circumferential wall and an inner hub wall, at least a portion of the spoke-like supprots extending from the circumferential wall to the hub wall.

13. The food dehydrator of claim 12, wherein the tray inlet includes a plurality of spaced, vertically oriented slots in the circumferential wall and the tray outlet includes a plurality of spaced, vertically oriented slots in the hub wall.

14. A food dehydrator for drying food with a heated airflow, the food dehydrator comprising a base defining a base inlet, a plurality of stackable trays defining an outer duct along the circumference of each of the plurality of trays, and a top member having an outer outlet defined along the circumference of the top member, the outer outlet being in substantial alignment with the outer duct defined by the trays.

* * * * *

UNITED STATES PATENT AND TRADEMARK OFFICE
CERTIFICATE OF CORRECTION

PATENT NO. : 5,423,249

DATED : June 13, 1995

INVENTOR(S) : Meyer

It is certified that error appears in the above-identified patent and that said Letters Patent is hereby corrected as shown below:

Col. 1, line 60, "assembly" should read -- assemble --
Col. 1, line 68, insert -- outlet -- after the word "outer"
Col. 5, line 27, "comprises" should read -- comprised --
Col. 5, line 38, "79" should read -- 49 --
Col. 6, line 5, "ito" should read -- into --
Col. 6, line 34, "previusly" should read -- previously --
Col. 7, line 38, "of" should read -- and --
Col. 7, line 48, "pluraltiy" should read -- plurality --
Col. 8, line 49, "supprots" should read -- supports --

Signed and Sealed this

Twenty-sixth Day of September, 1995

*Attest:*

BRUCE LEHMAN

*Attesting Officer*   *Commissioner of Patents and Trademarks*